D. E. NORMAN.
HAY SWEEP.
APPLICATION FILED JAN. 15, 1915.

1,185,430.

Patented May 30, 1916.
2 SHEETS—SHEET 1.

Inventor,
David E. Norman.

Witnesses:

By Victor J. Evans,
Attorney

D. E. NORMAN.
HAY SWEEP.
APPLICATION FILED JAN. 15, 1915.
1,185,430.
Patented May 30, 1916.
2 SHEETS—SHEET 2.
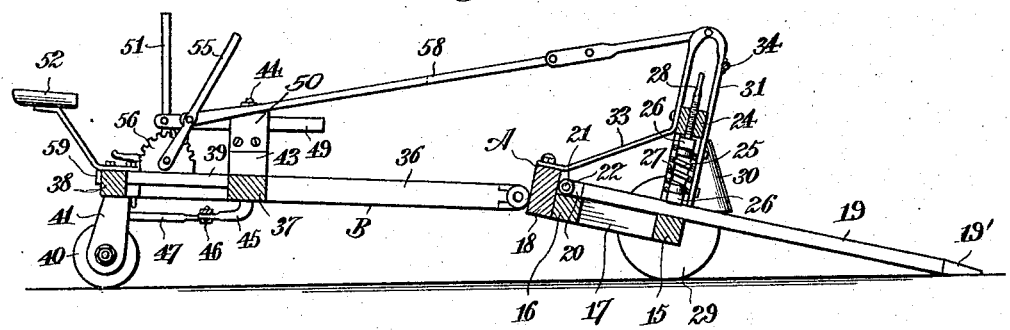
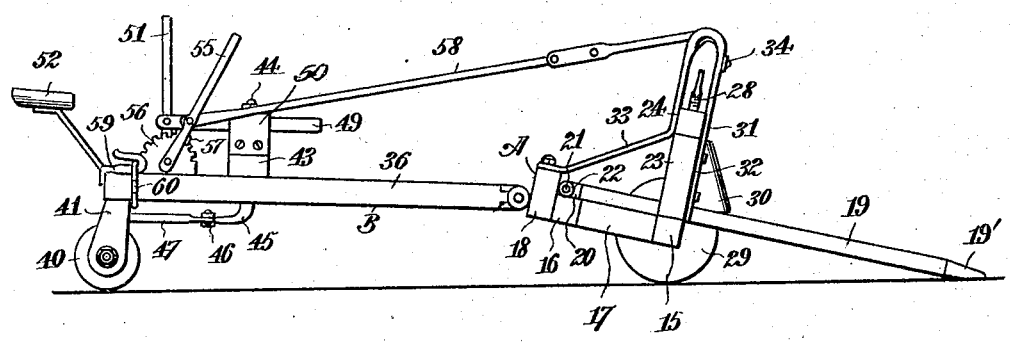
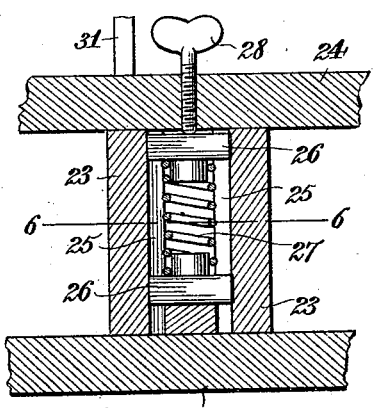
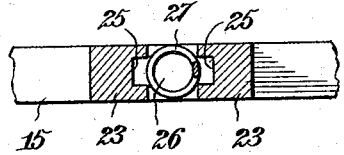
Inventor,
David E. Norman,
By Victor J. Evans,
Attorney.
Witnesses:

UNITED STATES PATENT OFFICE.

DAVID E. NORMAN, OF KILGORE, NEBRASKA.

HAY-SWEEP.

1,185,430.  Specification of Letters Patent.  Patented May 30, 1916.

Application filed January 15, 1915. Serial No. 2,432.

*To all whom it may concern:*

Be it known that I, DAVID E. NORMAN, a citizen of the United States, residing at Kilgore, in the county of Cherry and State of Nebraska, have invented new and useful Improvements in Hay-Sweeps, of which the following is a specification.

This invention relates to hay sweeps, sometimes known as bull rakes, for gathering hay in the field and for conveying the same to the stacking place.

The invention has for its object to produce a device of this class which will be simple in construction and inexpensive and in which the individual teeth shall be independently spring actuated so that any one tooth will be capable of yielding to obstructions without affecting the action of the remaining teeth.

A further object of the invention is to produce a device of the character described which will be equipped with a simple and effective steering apparatus so that the full power of the draft animals may be utilized when the device is being turned in the field.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
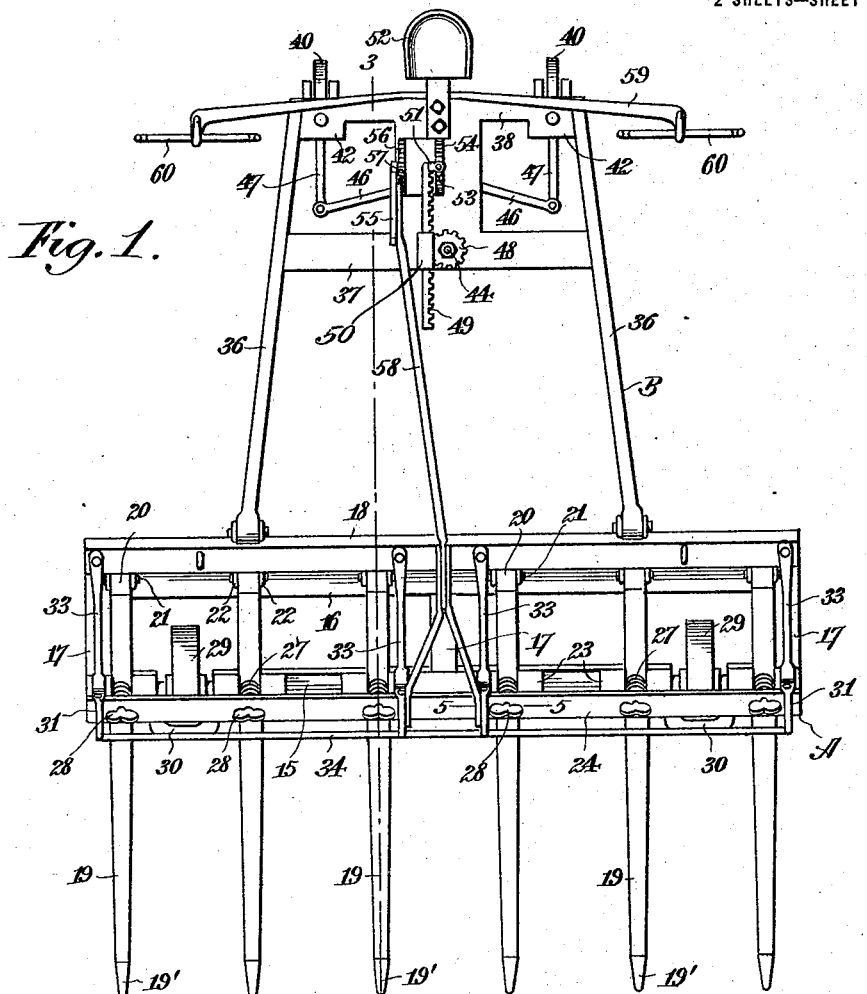
Figure 2:
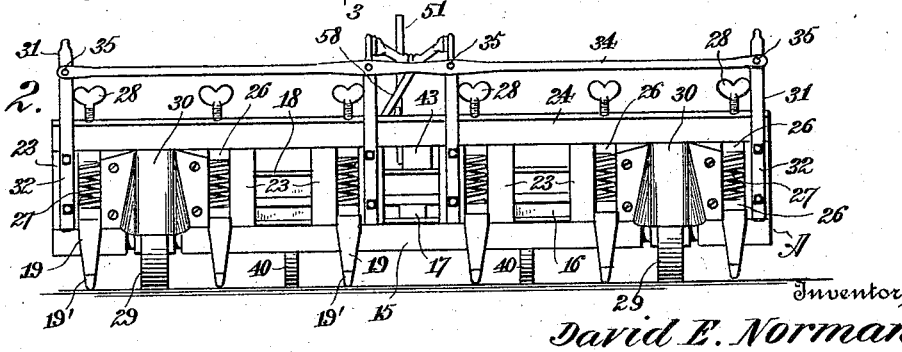

In the drawings,—Figure 1 is a top plan view of a device constructed in accordance with the invention. Fig. 2 is a front elevation of the same. Fig. 3 is a longitudinal sectional view taken on the line 3—3 in Fig. 1. Fig. 4 is a side elevation. Fig. 5 is a transverse sectional detail view taken on the line 5—5 in Fig. 1. Fig. 6 is a horizontal sectional detail view taken on the line 6—6 in Fig. 5.

Corresponding parts in the several figures are denoted by like characters of reference.

The improved device comprises in its construction the rake A and the push frame B.

The rake comprises a base frame which includes front and rear bars 15, 16 that are spaced and connected by means of braces 17. Securely bolted upon the rear bar 16 is a flange bar 18, so-called because when applied to the rear frame bar it projects materially above the same so as to form an upstanding flange with which the rake teeth are connected, as will presently appear. The rake teeth 19 which are made of wood are provided at their front ends with metal points 19' and at their rear ends with caps 20 made of cast metal and transversely apertured for the passage of pivot bolts 21 that engage eyes or bearing members 22 on the flange bar 18 with which each rake tooth is thus connected in such a manner as to be capable of pivotal movement in an approximately vertical plane.

Mounted on the front frame bar 15 are pairs of uprights 23 between which the rake teeth are guided, all of the uprights serving to support a cap beam 24. The pairs of uprights are provided on their opposed faces with vertical grooves 25 wherein slides 26 are guided, each pair of uprights containing between them two such slides between which a coiled spring 27 is supported. The lowermost slide between each pair of uprights engages the upper face of one of the rake teeth, and the uppermost slide between each pair of uprights is engaged by a set screw 28 threaded through the cap beam 24 and serving to adjust and regulate the tension of the spring which is exerted to force the rake tooth in a downward direction, at the same time permitting it to yield upwardly if an obstruction should be encountered.

The front frame bar 15 is provided with supporting wheels 29 which may be mounted thereon in any convenient manner, said wheels being protected by shields or guards 30 which will prevent the bearings being obstructed by hay or the like becoming entangled therewith.

The rake head, which may be regarded as comprising the base frame, the flange bar, the uprights and the cap beam, is reinforced by metallic braces each consisting of a rod or bar which is bent to form an inverted U-shaped portion 31 that extends upwardly with respect to the cap beam 24 which is straddled thereby, one limb of said U-shaped portion being extended downwardly, as shown at 32, and bolted or otherwise secured on the front face of one of the uprights 23, while the other limb is bent to form an inclined portion 33 which is terminally bolted on the upper face of the flange bar 18. The upwardly extending U-shaped loops are joined together by means of a cross bar 34 with which the several loops are connected by means of fastening means, such as rivets 35.

The push frame B of the improved device is composed of side members 36 which are spaced and connected by means of cross bars 37, 38 between which a platform 39 is supported. The forward ends of the side beams 36 are hingedly connected with the flange bar 18 of the rake head. The rearward end of the push frame is supported on wheels 40 mounted in bifurcated shanks 41, the latter being journaled or swiveled in approximately vertical bearings 42. The front cross bar 37 supports a bearing member or block 43 wherein is journaled an approximately vertical shaft 44 having at its lower end a crank 45 which is connected by links 46 with arms or cranks 47 that extend radially from the wheel carrying shanks 41, which latter may be turned about their respective axes by rotating the shaft 44, thus permitting the machine to be steered. The shaft 44 carries at its upper end a spur wheel 48 meshing with a rack 49 which is held slidably in engagement therewith by a supporting flange 50. The rack bar 49 is suitably connected with a lever 51 whereby it may be actuated to rotate the spur wheel and the shaft wherein it is mounted, thereby actuating the steering mechanism. The lever 51 which is supported in convenient proximity to the driver's seat 52 is provided with a stop member 53 engaging a rack segment 54 whereby the parts may be retained in position at various adjustments. A second lever 55 having a stop member 57 that engages a rack segment 56 is connected by means of a rod 58 that is bifurcated at its front end with some of the upstanding U-shaped loops 31 on the rake head, which latter, by proper manipulation of the lever 55, may be tilted so as to raise and lower the forward ends of the teeth. It is obvious that in gathering a load the forward ends of the teeth will be depressed into engagement with the surface of the ground, the teeth being so shaped that they will ride easily over the ground, except when obstructions are encountered, in which event they will individually yield to such obstructions without injury either to the teeth or to the rest of the apparatus. When a load has been gathered, the front ends of the teeth are tilted upwardly, thus supporting the load while it is being conveyed to the stacking place in the customary manner.

Mounted on the rear end of the push frame is a draft bar 59, the ends of which are provided with eveners 60 for the attachment of draft animals. The draft, however, may be applied directly to the ends of the rake head or in any other customary and well known manner.

It will be readily seen that by the use of the improved steering gear, the power of both draft animals may be utilized while the machine is being turned, whereas, in the absence of such steering gear, the driver in turning has been obliged to hold back one of the draft animals, throwing the entire work on the other animal while the machine is being pivoted around.

It will, of course, be understood that while in the drawings hereto appended a sweep has been shown equipped with only six rake teeth 19, it is evident that any desired number of teeth may in practice be used, it being customary to use from eleven to thirteen teeth. I also desire it to be understood that in place of the push frame herein shown the sweep may be provided with a side hitch of well known construction.

Having thus described the invention, what is claimed as new, is:—

1. In a device of the class described, a rake head including a base frame, a flange bar on the rear portion of said frame and extending upwardly therefrom, uprights on the front portion of said frame, and a cap beam supported on the uprights, rake teeth hinged on the forward face of the upwardly extending portion of the flange bar and extending between pairs of uprights, and springs fitted between the uprights and exerting downward pressure with respect to the rake teeth.

2. In a device of the class described, a rake head including a base frame, a flange bar on the rear portion of said frame and extending upwardly therefrom, uprights on the front portion of said frame, and a cap beam supported on the uprights, rake teeth hinged on the flange bar and extending between pairs of uprights, springs fitted between the uprights and exerting downward pressure with respect to the rake teeth, slides at the lower ends of the springs and bearing against the rake teeth, slides at the upper ends of the springs, and set screws threaded through the cap beam and engaging the uppermost slides to regulate the tension of the springs.

3. In a hay rake, a rake head comprising a base frame having an upwardly extending flange at the rearward portion thereof, uprights rising in pairs from the forward portion of said base frame, and a cap beam supported upon and connecting together the said uprights, rake teeth hinged on the forward portion of the flange, extending forwardly and guided between the pairs of uprights, and springs housed between the pairs of uprights, the cap beam and the rake teeth and exerting downward tension on the latter.

4. In a device of the class described, a rake head including pairs of uprights, a cap beam supported thereon, and a flange bar, rake teeth connected pivotally with the flange bar and guided between pairs of uprights, springs mounted between the pairs of uprights and forcing the rake teeth individually in a groundward direction, and braces including inverted U-shaped loops extending upwardly with respect to the cap beam and having limbs connected with some of the uprights and other limbs secured on the flange bar, said rake head being provided with supporting wheels, in combination with a push frame having side members hingedly connected with the rake head, supporting wheels for said push frame, a lever mounted on the push frame, and a rod connecting said lever with some of the upstanding U-shaped loops whereby the rake head may be tilted relatively to the push frame.

In testimony whereof I affix my signature in presence of two witnesses.

DAVID E. NORMAN.

Witnesses:
WALTER S. YATES,
J. A. RATHBURNER.

Copies of this patent may be obtained for five cents each, by addressing the "Commissioner of Patents, Washington, D. C."